United States Patent
Chen et al.

(10) Patent No.: US 10,250,795 B2
(45) Date of Patent: Apr. 2, 2019

(54) IDENTIFYING A FOCUS POINT IN A SCENE UTILIZING A PLURALITY OF CAMERAS

(71) Applicant: MOTOROLA MOBILITY LLC, Chicago, IL (US)

(72) Inventors: Yinhu Chen, Deerfield, IL (US);
Daniel Bloom, Loveland, CO (US);
Susan Yanqing Xu, Westmont, IL (US);
Valeriy Marchevsky, Glenview, IL (US)

(73) Assignee: Motorola Mobility LLC, Chicago, IL (US)

( * ) Notice: Subject to any disclaimer, the term of this patent is extended or adjusted under 35 U.S.C. 154(b) by 127 days.

(21) Appl. No.: 15/459,621

(22) Filed: Mar. 15, 2017

(65) Prior Publication Data

US 2018/0270408 A1 Sep. 20, 2018

(51) Int. Cl.
*H04N 5/232* (2006.01)
*H04N 5/247* (2006.01)
*G02B 7/28* (2006.01)

(52) U.S. Cl.
CPC ......... *H04N 5/23212* (2013.01); *G02B 7/285* (2013.01); *H04N 5/247* (2013.01)

(58) Field of Classification Search
CPC .... H04N 5/23212; H04N 5/247; G02B 7/285; G03B 35/08
See application file for complete search history.

(56) References Cited

U.S. PATENT DOCUMENTS

| | | | |
|---|---|---|---|
| 8,213,786 B2 * | 7/2012 | Song | G03B 13/32 396/121 |
| 8,416,303 B2 | 4/2013 | Gomi | |
| 9,703,175 B2 * | 7/2017 | Dayana | H04N 5/23212 |
| 9,886,640 B1 | 2/2018 | Chen et al. | |
| 10,057,499 B1 | 8/2018 | Chen et al. | |
| 2002/0136435 A1 | 9/2002 | Prokoski | |
| 2007/0189583 A1 | 8/2007 | Shimada et al. | |
| 2008/0094486 A1 | 4/2008 | Fuh et al. | |
| 2010/0128938 A1 | 5/2010 | Chung et al. | |
| 2010/0134250 A1 | 6/2010 | Chung et al. | |

(Continued)

OTHER PUBLICATIONS

Bagheri, Saeid et al., U.S. Appl. No. 15/476,729, filed Mar. 31, 2017, The United States Patent and Trademark Office.

(Continued)

*Primary Examiner* — Luong T Nguyen
(74) *Attorney, Agent, or Firm* — Yudell Isidore PLLC

(57) ABSTRACT

A method, system, and computer program product to obtain a focus point of a current scene. The method includes performing a first focus procedure in a first direction via a main lens of a main camera of an image capturing device having at least two cameras. The method further includes concurrently performing a second autofocus procedure in a second direction that is opposite the first direction via at least one auxiliary lens of at least one auxiliary camera. The method further includes identifying a focus point within autofocus data collected during the first and second focus procedure. The method further includes, in response to determining the focus point was identified by the at least one auxiliary camera: terminating the first focus procedure; and automatically synchronizing a position of the main lens to that of the at least one auxiliary lens.

18 Claims, 10 Drawing Sheets

(56) References Cited

U.S. PATENT DOCUMENTS

| | | | |
|---|---|---|---|
| 2012/0002082 A1 | 1/2012 | Johnson et al. | |
| 2012/0147139 A1 | 6/2012 | Li et al. | |
| 2012/0257065 A1* | 10/2012 | Velarde | H04N 5/2258 348/175 |
| 2013/0235163 A1 | 9/2013 | Joo | |
| 2014/0337930 A1 | 11/2014 | Hoyos et al. | |
| 2015/0092066 A1 | 4/2015 | Geiss et al. | |
| 2016/0227100 A1 | 8/2016 | Liu et al. | |
| 2016/0295097 A1* | 10/2016 | Shanmugavadivelu | H04N 5/2254 |
| 2016/0299349 A1 | 10/2016 | Cho | |
| 2016/0301840 A1 | 10/2016 | Du et al. | |
| 2017/0017136 A1* | 1/2017 | Kao | G03B 13/20 |
| 2017/0064184 A1 | 3/2017 | Tsai | |
| 2017/0163902 A1 | 6/2017 | Wu | |
| 2017/0201684 A1 | 7/2017 | Kang et al. | |
| 2017/0277018 A1 | 9/2017 | Dayana et al. | |
| 2017/0324906 A1 | 11/2017 | Kang et al. | |
| 2018/0039845 A1 | 2/2018 | Chen et al. | |
| 2018/0096212 A1 | 4/2018 | Lin | |
| 2018/0139369 A1 | 5/2018 | Chen et al. | |

OTHER PUBLICATIONS

Chen, Yin-Hu et al., U.S. Appl. No. 15/398,532, filed Jan. 4, 2017, The United States Patent and Trademark Office.

Chen, Yin-Hu et al., U.S. Appl. No. 15/353,435, filed Nov. 16, 2016, The United States Patent and Trademark Office.

Chen, Yin-Hu et al., U.S. Appl. No. 15/354,501, filed Nov. 17, 2016, The United States Patent and Trademark Office.

Chen, Yin-Hu, et al., U.S. Appl. No. 15/441,085, filed Feb. 23, 2017, The United States Patent and Trademark Office.

Chen, Yin-Hu, et al., U.S. Appl. No. 15/438,699, filed Feb. 21, 2017, The United States Patent and Trademark Office.

Li, Dalong, et al., U.S. Appl. No. 15/013,232, filed Feb. 2, 2016, The United States Patent and Trademark Office.

Li, Qiaotian, et al., U.S. Appl. No. 15/464,118, filed Mar. 20, 2017, The United States Patent and Trademark Office.

Matsimanis, Peter, et al., U.S. Appl. No. 15/435,503, filed Feb. 17, 2017, The United States Patent and Trademark Office.

Musatenko, Yuriy, et al., U.S. Appl. No. 15/349,948, filed Nov. 11, 2016, The United States Patent and Trademark Office.

Ho, Tuan V., Non-Final Office Action, U.S. Appl. No. 15/464,118, The United States Patent and Trademark Office, dated Feb. 23, 2018.

Pasiewicz, Daniel M., Non-Final Office Action, U.S. Appl. No. 15/354,501, The United States Patent and Trademark Office, dated Mar. 15, 2018.

Giles, Nicholas G., Non-Final Office Action, U.S. Appl. No. 15/435,503, The United States Patent and Trademark Office, dated Jun. 21, 2018.

Monk, Mark T., Final Office Action, U.S. Appl. No. 15/464,118, The United States Patent and Trademark Office, dated Aug. 21, 2018.

Segura, Cynthia, Non-Final Office Action, U.S. Appl. No. 15/398,532, The United States Patent and Trademark Office, dated Sep. 4, 2018.

* cited by examiner

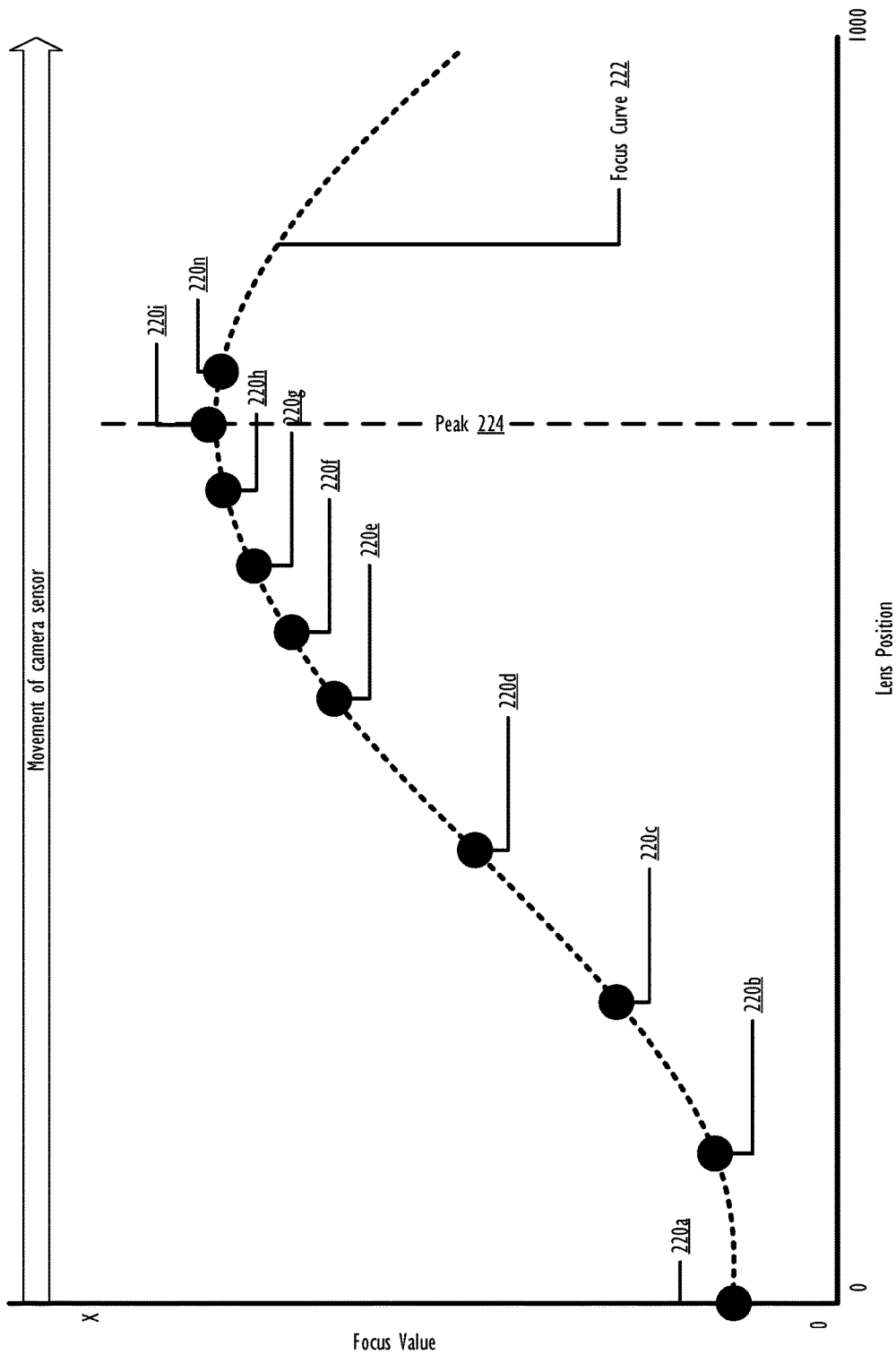

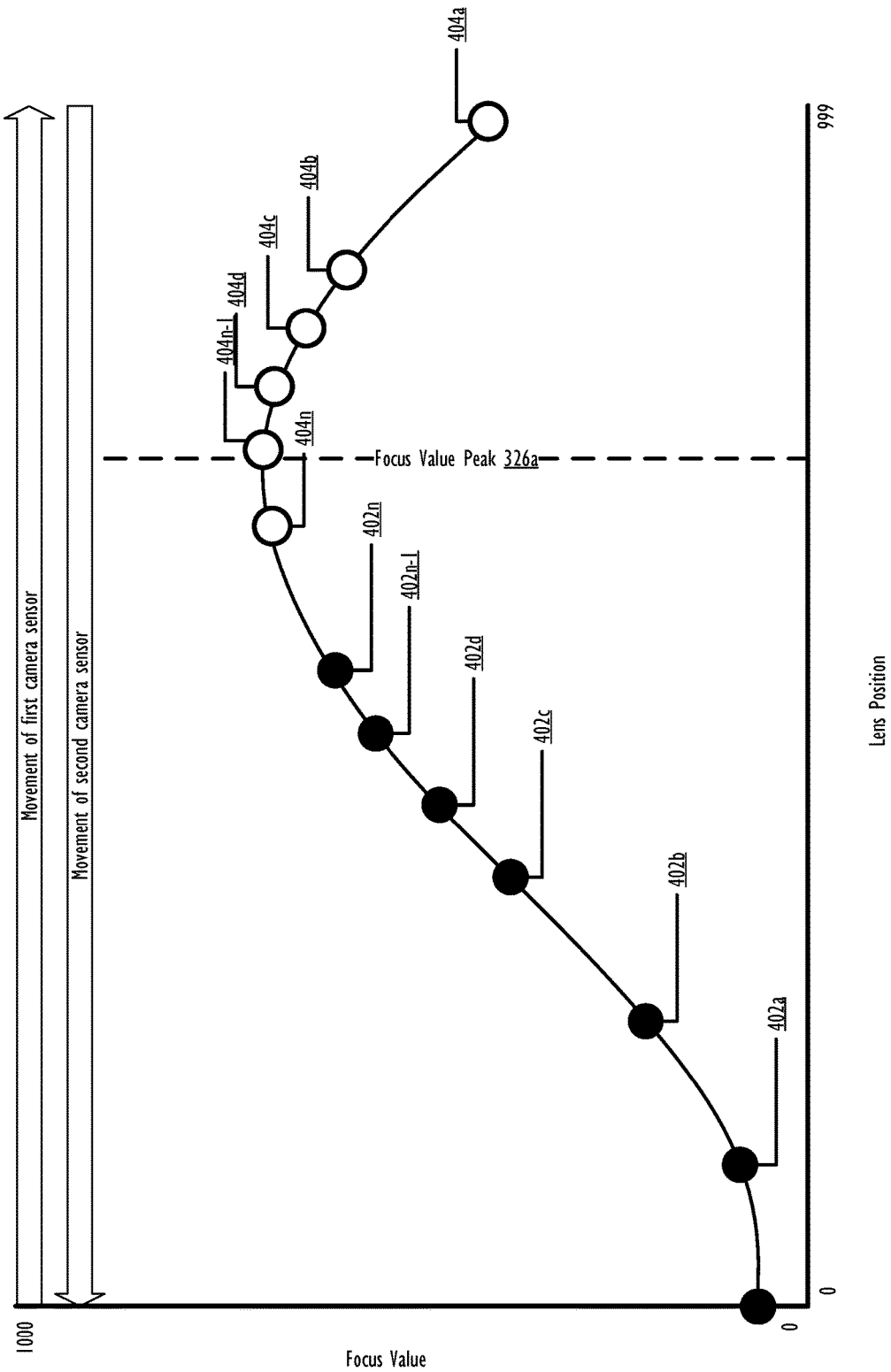

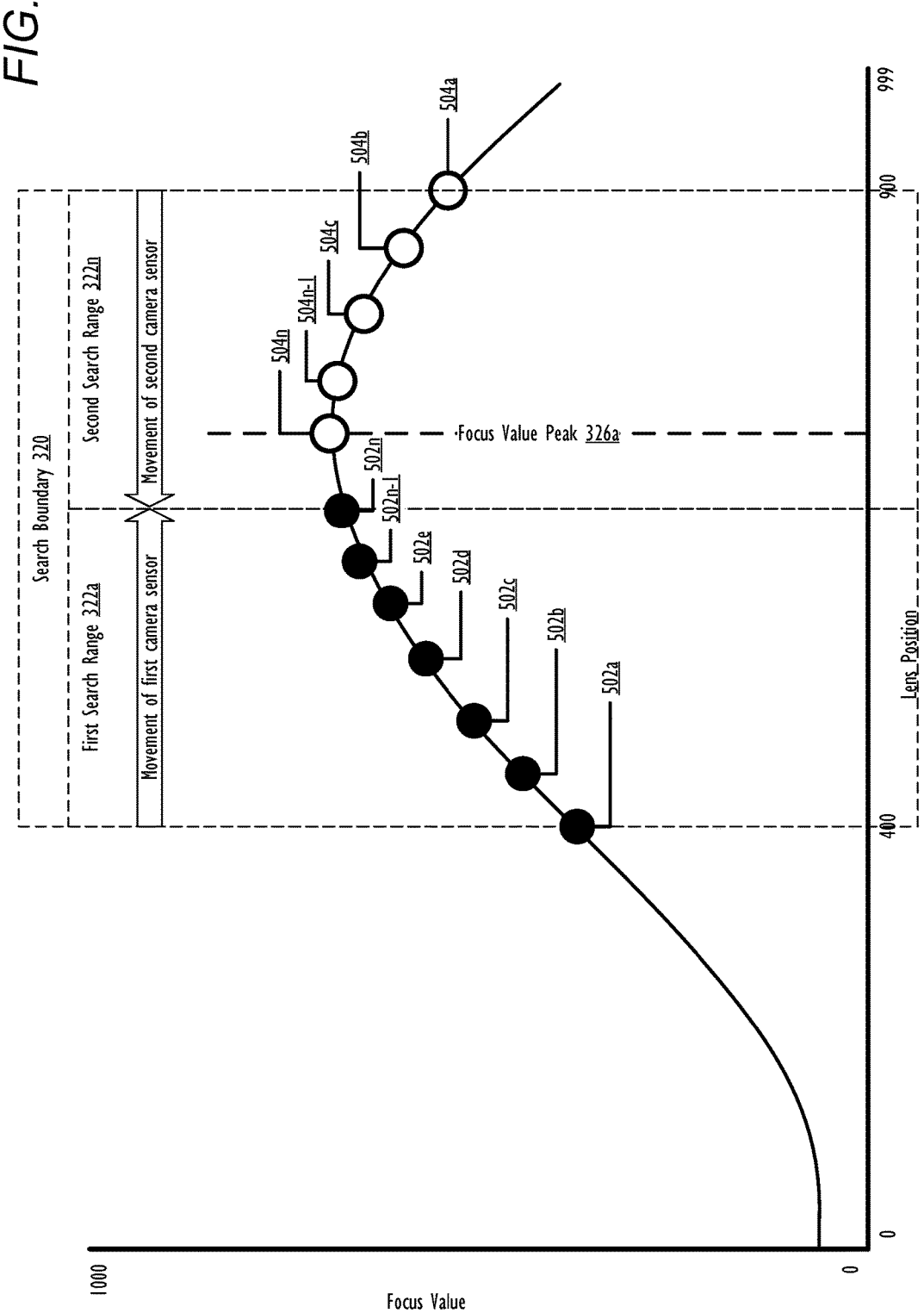

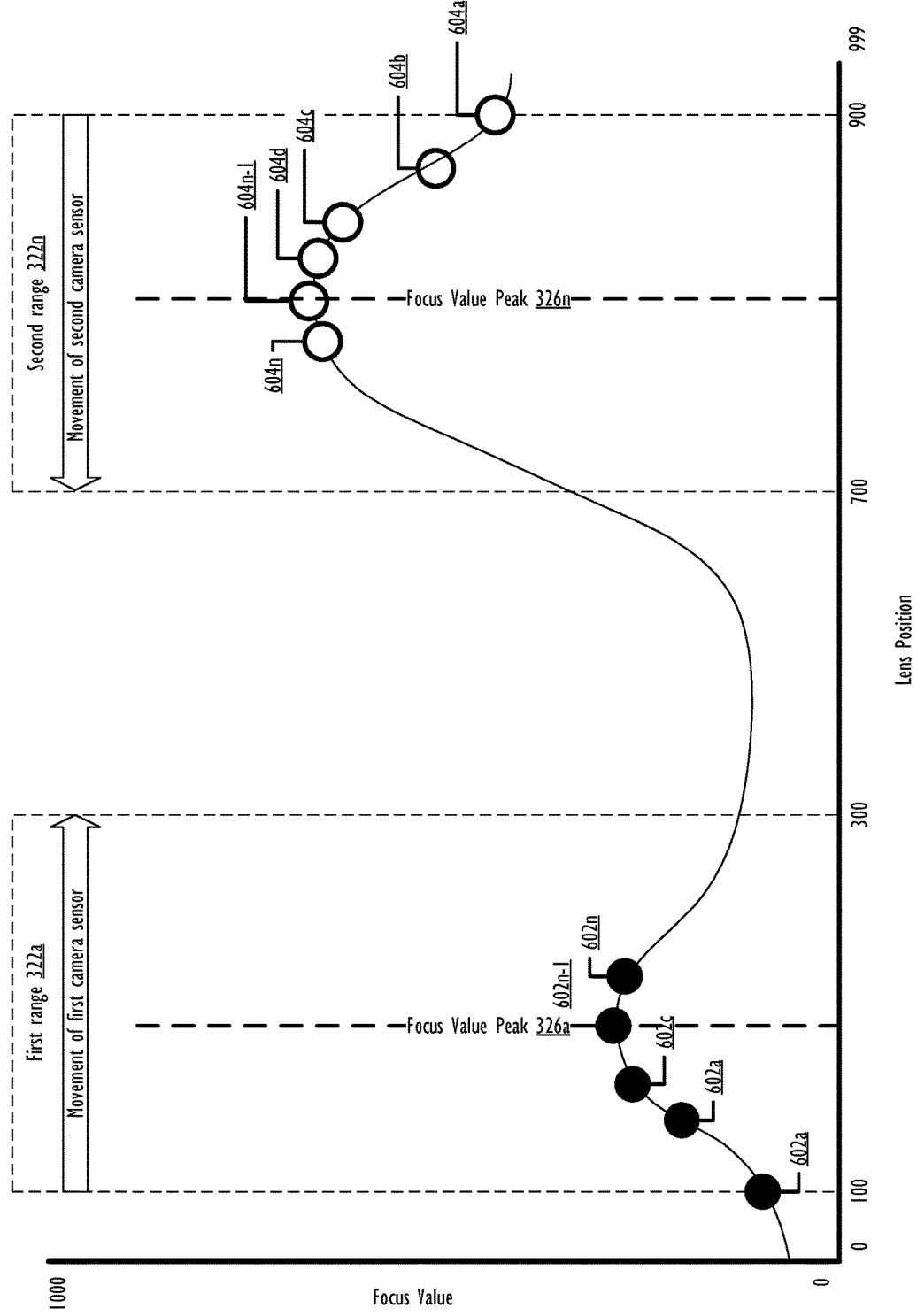

IDENTIFYING A FOCUS POINT IN A SCENE UTILIZING A PLURALITY OF CAMERAS

BACKGROUND

1. Technical Field

The present disclosure generally relates to electronic devices for capturing images and in particular to a method for obtaining a focus point of a current scene.

2. Description of the Related Art

Modern image capturing devices, such as cameras associated with cellular phones, are equipped with cameras that can be used to capture images and/or video. These devices use a dedicated camera within the device to focus on a scene, provide a view of the scene on a viewfinder, and capture an image and/or video associated with the scene. The dedicated cameras are preconfigured with autofocus procedures or algorithms that adjust a position of a camera lens to find a focus point in a scene. Typically, however, the image/video cannot be captured until the autofocus procedure has completed and a focus point has been obtained in a current scene. This may introduce delay that, in many situations, is unacceptable to a user of the image capturing device. For example, a delay in capturing an image caused by lengthy autofocus procedures may cause the user of the image capturing device to "miss" a subject that was passing through the current scene only briefly. Current solutions may minimize a duration and/or repetition of the autofocus procedures. However, limiting the duration and/or repetition of the autofocus procedures may have the side effect of causing a camera to select a suboptimal focus point, which may result in a captured image/video that is out of focus.

BRIEF DESCRIPTION OF THE DRAWINGS

The description of the illustrative embodiments is to be read in conjunction with the accompanying drawings. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 2B illustrates an example focus value curve followed by the single camera sensor in identifying the focus point in the current scene, in accordance with the prior art;

FIG. 4 illustrates an example focus value curve utilized by a plurality of cameras to identify a focus point of a current scene, in accordance with one or more embodiments;

FIG. 5 illustrates an example focus value curve having a divided search range utilized by a plurality of cameras, in accordance with one or more embodiments;

FIG. 6 illustrates an example focus value curve having a first search range and a second search range, in accordance with one or more embodiments;

DETAILED DESCRIPTION

Figure 1:
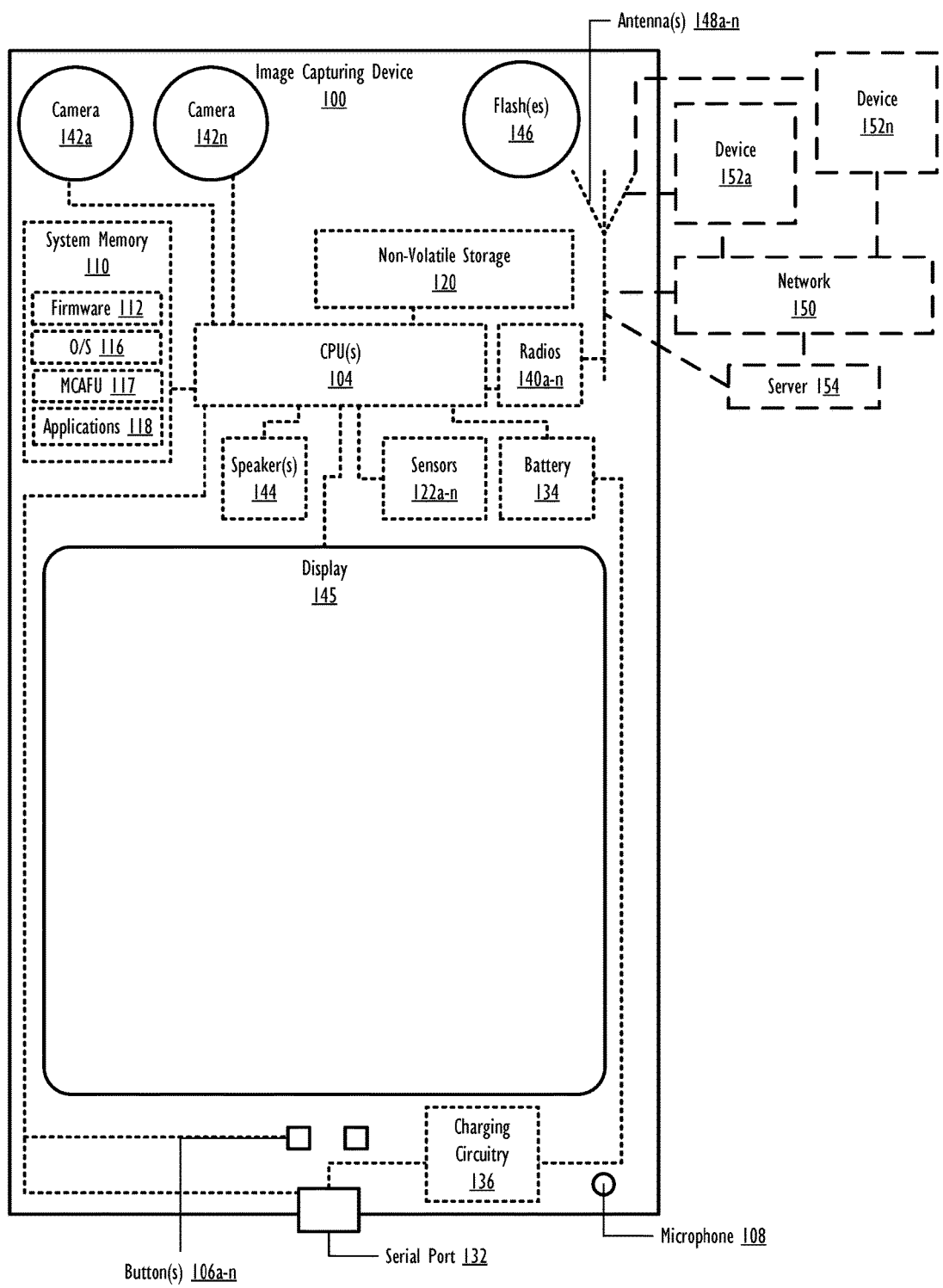
FIG. 1 illustrates an image capturing device within which certain aspects of the disclosure can be practiced, in accordance with one or more embodiments.

The illustrative embodiments provide a method, system, and computer program product to obtain a focus point of a current scene. The method includes performing a first focus procedure in a first direction via a main lens of a main camera of an image capturing device having at least two cameras. The method further includes concurrently performing a second autofocus procedure in a second direction that is opposite the first direction via at least one auxiliary lens of at least one auxiliary camera. The method further includes identifying a focus point within autofocus data collected during the first and second focus procedure and determining whether the focus point was identified by the at least one auxiliary camera. The method further includes, in response to determining the focus point was identified by the at least one auxiliary camera: terminating the first focus procedure; and automatically synchronizing a position of the main lens to that of the at least one auxiliary lens.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within image capturing device 100 are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Now turning to FIG. 1, there is illustrated an example image capturing device 100 within which one or more of the described features of the various embodiments of the disclosure can be implemented. In one embodiment, image capturing device 100 can be any electronic device that is equipped with at least two cameras. Example image capturing devices can include, but are not limited to, a desktop computer, a monitor, a notebook computer, a mobile phone, a digital camera, a video recorder, or a tablet computer. Image capturing device 100 includes at least one processor or central processing unit (CPU) 104. CPU(s) 104 is coupled to non-volatile storage 120 and system memory 110, within which firmware 112, operating system (OS) 116, multi-camera autofocus utility (MCAFU) 117, and applications 118 can be stored for execution by CPU(s) 104. According to one aspect, MCAFU 117 executes within image capturing device 100 to perform the various methods and functions described herein. In one or more embodiments, MCAFU 117 simultaneously performs an autofocus procedure via at least two cameras to identify a focus point of a current scene, and MCAFU 117 synchronizes an identified focus point to a main camera that is used to capture an image and/or video media. For simplicity, MCAFU 117 is illustrated and described as a stand-alone or separate software/firmware/logic component, which provides the specific functions and methods described below. However, in at least one embodiment, MCAFU 117 may be a component of, may be combined with, or may be incorporated within firmware 112, or OS 116, and/or within one or more of applications 118.

As shown, image capturing device 100 may include input devices and output devices that enable a user to interface with image capturing device 100. In the illustrated embodiment, image capturing device 100 includes at least two cameras 142a-n, camera flash(es) 146, display 145, buttons 106a-n, microphone(s) 108, and speaker(s) 144. While two cameras (cameras 142a-n) are illustrated, image capturing device 100 may include additional cameras, in other embodiments. Hardware buttons 106a-n are selectable buttons which are used to receive manual/tactile input from a user to control specific operations of image capturing device 100 and/or of applications executing thereon. In one embodiment, hardware buttons 106a-n may also include or may be connected to one or more sensors (e.g. a fingerprint scanner) and/or may be pressure sensitive. Hardware buttons 106a-n may also be directly associated with one or more functions of a graphical user interface (not pictured) and/or functions of an OS, application, or hardware of image capturing device 100. In one embodiment, hardware buttons 106a-n may include a keyboard. Microphone(s) 108 may be used to receive spoken input/commands from a user. Speaker(s) 144 is used to output audio.

CPU(s) 104 is also coupled to sensors 122a-n and display 145. Sensors 122a-n can include, but are not limited to, at least one of: infrared (IR) sensors, thermal sensors, light sensors, proximity sensors, and camera/image sensors. Display 145 is capable of displaying text, media content, and/or a graphical user interface (GUI) of firmware and/or one or more applications executing on image capturing device 100. The GUI can be rendered by CPU(s) 104 for viewing on display 145, in one embodiment, or can be rendered by a graphics processing unit (GPU), in another embodiment. In one embodiment, display 145 is a touch screen that is also capable of receiving touch input from a user of image capturing device 100, when the user is interfacing with a displayed GUI. In at least one embodiment, image capturing device 100 can include a plurality of virtual buttons or affordances that operate in addition to, or in lieu of, hardware buttons 106a-n. For example, image capturing device 100 can be equipped with a touch screen interface and provide, via a GUI, a virtual keyboard or other virtual icons for user interfacing therewith.

Image capturing device 100 also includes serial port 132 (e.g., a universal serial bus (USB) port), battery 134, and charging circuitry 136. Serial port 132 can operate as a charging port that receives power via an external charging device (not pictured) for charging battery 134 via charging circuitry 136. Battery 134 may include a single battery or multiple batteries for providing power to components of image capturing device 100. Serial port 132 may also function as one of an input port, an output port, and a combination input/output port. In one embodiment, battery 134 may include at least one battery that is removable and/or replaceable by an end user. In another embodiment, battery 134 may include at least one battery that is permanently secured within/to image capturing device 100.

Image capturing device 100 may also include one or more wireless radios 140*a-n* and can include one or more antenna(s) 148*a-n* that enable image capturing device 100 to wirelessly connect to, and transmit and receive voice and/or data communication to/from, one or more other devices, such as devices 152*a-n* and server 154. As a wireless device, image capturing device 100 can transmit data over a wireless network 150 (e.g., a Wi-Fi network, cellular network, Bluetooth® network (including Bluetooth® low energy (BLE) networks), a wireless ad hoc network (WANET), or personal area network (PAN)). In one embodiment, image capturing device 100 may be further equipped with infrared (IR) device (not pictured) for communicating with other devices using an IR connection. In another embodiment, wireless radios 140*a-n* may include a short-range wireless device, including, but not limited to, a near field communication (NFC) device. In still another embodiment, image capturing device 100 may communicate with one or more other device(s) using a wired or wireless USB connection.

Figure 2A:
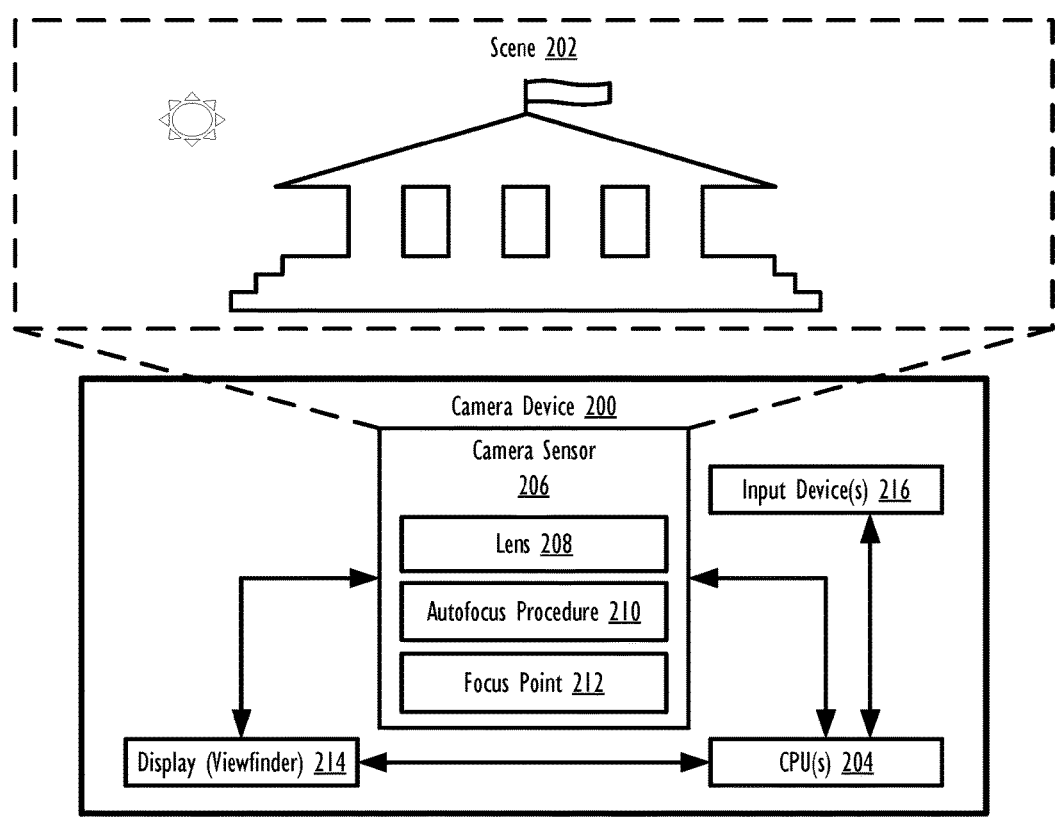
FIG. 2A illustrates a camera device that is configured to identify a focus point in a current scene using a single camera sensor, in accordance with the prior art.

FIG. 2A is a block diagram illustrating a camera device that is configured to identify a focus point in a current scene using a single camera sensor, in accordance with the prior art. It should be noted that camera device 200 may be configured as a generic data processing system, mobile device, or another electronic device that includes the functional hardware and software illustrated in FIG. 2A. Camera device 200 can include CPU(s) 204, camera sensor 206, display 214, and input device(s) 216. CPU(s) 204 receives an input from at least one input device 216 to perform autofocus procedure 210 and/or capture an image/video of current scene 202. In response to receiving the input, CPU 204 initializes autofocus procedure 210 on lens 208 of camera sensor 206. As presented herein, a focus procedure (e.g., autofocus procedure 210) provides a set of default instructions for continually manipulating a lens 208 until lens 208 has identified a particular position (e.g., lens position 220*i* of FIG. 2B) for which at least a point or area (e.g., a subject or background) is in-focus for current scene 202. During autofocus procedure 210, lens 208 may be adjusted to any position in a given range of positions, and lens 208 is moved based on a current step setting applied to that lens. For example, lens 208 may be set to any position from among 1000 logical steps (e.g., any position from among 0-999 steps, where 0 is a near focus and 999 is a far focus, or vice versa). Autofocus procedure 210 establishes a size of a step movement of lens 208 across the given step range for camera sensor 206.

Referring now to FIG. 2B, as lens 208 moves across the range, a focus value is read at each position 220*a-n* along focus curve 222 to identify a peak 224 at which the focus value is the greatest. The position of lens 208 at peak 224 is focus point 212. Autofocus procedure 210 may specify multiple step sizes and may switch between the step sizes based on a most recent focus value identified by lens 208. For example, autofocus procedure 210 may establish a coarse focus step size of 80 and a fine focus step size of 20. During a coarse focus portion of autofocus procedure 210, lens 208 would be moved from position 0, to position 80, to position 160, etc., until a focus value is returned that exceeds a predetermined value. The fine focus step size (e.g., 20) would then be applied to lens 208, and the autofocus procedure continues moving lens 208 in steps of +20 until peak 224 is identified. In response to determining a most recent focus value is less than a previous focus value, lens 208 performs, via autofocus procedure 210, at least one reverse scan in which the direction of lens 208 is reversed and an adjusted step size (e.g., step size of 10) is applied. It should be noted that the adjusted step size may be greater than or less than the previous step size. Autofocus procedure then continues moving lens 208 at the adjusted step size until a greatest focus value (e.g., the focus value at lens position 220*i*), which corresponds to peak 224, is identified as focus point 212. Images and/or video captured by camera sensor 206 while lens 208 is in a position corresponding to focus point 212 are then in-focus for scene 202.

Figure 3:
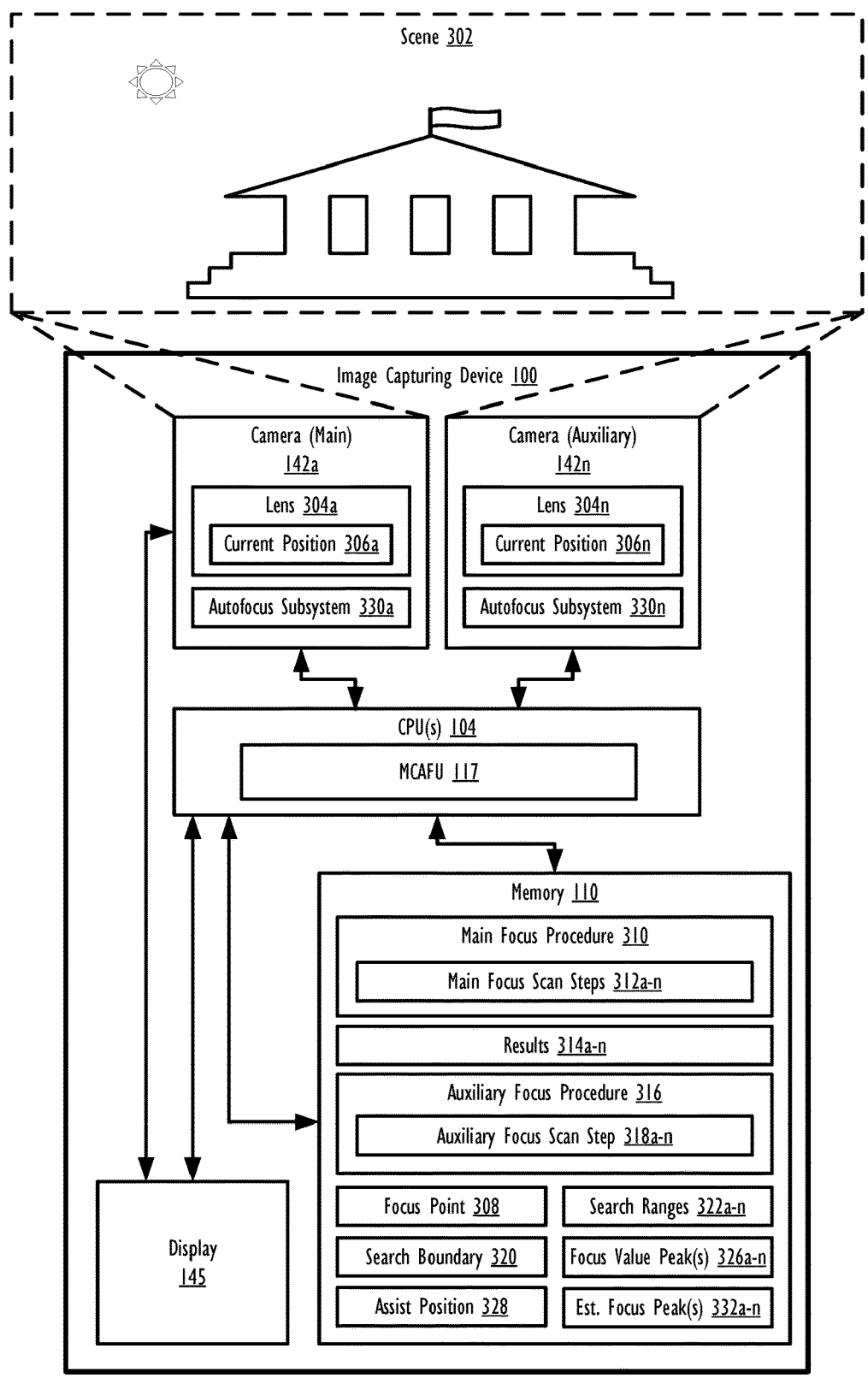
FIG. 3 illustrates an example image capturing device configured to identify a focus point of a current scene using a plurality of cameras, in accordance with one or more embodiments.

FIG. 3 is a block diagram illustrating additional functional components within example image capturing device 100, which is configured to obtain a focus point of a current scene using at least two cameras, in accordance with one or more embodiments of the present disclosure. As illustrated, image capturing device 100 includes CPU(s) 104, memory 110, main camera 142*a*, auxiliary camera 142*n*, and display 145. In one or more embodiments, auxiliary camera 142*n* may include multiple auxiliary cameras. In one or more embodiments, main camera 142*a* and/or and auxiliary camera 142*n* may be used to capture images and/or video. Each of cameras 142*a-n* is configured with a lens 304*a-n* and at least one autofocus subsystem 330*a-n*, which is used in conjunction with a focus procedure (e.g., main focus procedure 310) to move lenses 304*a-n* of cameras 142*a-n* into focus. Autofocus subsystems 330*a-n* may include, but are not limited to, a contrast-based subsystem, time of flight (ToF) subsystem, and/or phase detection auto focus (PDAF) subsystem. Autofocus subsystems 330*a-n* include at least one component, such as at least one sensor, rangefinder, motor, laser and/or assist lamp, to assist lenses 304*a-n* in obtaining focus point 308. In one or more embodiments, each of cameras 142*a-n* have a same field of view and a same step range (e.g., 0-999 lens positions).

Main focus procedure 310 defines at least one focus algorithm that is performed by main camera 142*a* to determine focus value peak 326*a* in current scene 302. Main focus procedure 310 also includes focus scan steps 312*a-n*, which dictate, for a particular focus algorithm, the size of a step movement of a corresponding lens (e.g., lens 304*a*) across the given step range for a corresponding camera (e.g., main camera 142*a*). For example, if a focus scan step 312*a* is set to 64 for coarse scanning, lens 304*a* moves in steps of 64 during a corresponding coarse scanning focus procedure of main focus procedure 310. In one or more embodiments, the coarse scanning focus procedure continues until a different focus algorithm (e.g., fine scanning focus procedure utilizing step size 312*b* corresponding moves in steps of +32) is applied to lens 304*a*. For example, CPU(s) 104 may apply step size 312*b* responsive to detecting that a returned focus value(s) during coarse scanning focus procedure has exceeded a predetermined value. During main focus procedure 310, lens 304*a* is moved in a first direction (e.g., from near focus to far focus or far focus to near focus).

Auxiliary focus procedure 316 provides a set of instructions for automatically focusing on current scene 302 by lens 304*n* of auxiliary camera 142*n*. Auxiliary focus procedure 316 defines at least one focus algorithm that is used by auxiliary camera 142*n* to determine focus value peak 326*n* in current scene 302. Auxiliary focus procedure 316 further includes auxiliary focus scan steps 318a-n. Each of auxiliary focus scan steps 318a-n dictates, for a particular focus algorithm associated with auxiliary focus procedure 316, a size of a step movement of lens 304n across a given step range. For example, if a focus scan step 318b is set to 64 for coarse scanning, lens 304n moves in steps of 64 during a corresponding coarse scanning focus procedure of auxiliary focus procedure 316. In one or more embodiments, the coarse scanning focus procedure continues until a different focus algorithm (e.g., fine scanning focus procedure utilizing step size 318b corresponding to moves in steps of +32) is applied to lens 304n. For example, CPU(s) 104 may apply step size 318b responsive to detecting that a returned focus value(s) during coarse scanning focus procedure has exceeded a predetermined value. During auxiliary focus procedure 316, lens 304n is moved in a second direction opposite of the first direction of main focus procedure 310 (e.g., from far focus to near focus or near focus to far focus). It should be noted that in one or more embodiments, main focus procedure 310 and auxiliary focus procedure 316 are performed simultaneously.

In one or more embodiments, main camera 142a continually outputs its current frame (a live representation of current scene 302 as captured by main camera 142a) to display 145 such that only a real-time view of a current frame of main camera 142a is viewable on display 145, and a current frame of auxiliary camera 142n is not viewable on display 145. Thus, a change in a current frame that is associated with a movement of lens 304n of auxiliary camera 142n, as captured by auxiliary camera 142n during auxiliary focus procedure 316, is not viewable on display 145 for a user of image capturing device 100.

Referring now to FIG. 4, there is illustrated an example focus value curve utilized by a plurality of cameras, in accordance with one or more embodiments. During main focus procedure 310, lens 304a is moved in a first direction (e.g., from near focus to far focus) corresponding to steps 402a-n. Simultaneously, during auxiliary focus procedure 316, lens 304n is moved in a second direction (e.g., from far focus to near focus) corresponding to steps 404a-n. At each step, a focus value is read by cameras 142a-n, shared among cameras 142a-n, and returned to CPU(s) 104. This process continues until a focus value peak (e.g., focus value peak 326a) is identified by at least one of lenses 304a-n.

Referring now again to FIG. 3, CPU(s) 104 monitors focus values returned by cameras 142a-n. In one embodiment, CPU(s) 104 determines when a focus value returned at a most recent step (e.g., a focus value returned at step 404n) by a particular camera (e.g., camera 142n) is less than a focus value returned at a second most recent step (e.g., a focus value at step 404n-1). In one embodiment, in response to determining the focus value returned at a most recent step (e.g., step 404n) is less than the focus value returned at the second most recent step (step 404n-1), CPU(s) 104 determines the focus value returned at the second most recent step (step 404n-1) is the focus value peak (e.g., focus value peak 326a). The position of the lens (e.g., lens 304n) of the particular camera (camera 142n) is then identified by CPU(s) 104 as focus point 308. In response to a particular camera identifying focus point 308, autofocus procedures utilized by all other cameras of image capturing device 100 are automatically terminated. For example, in response to auxiliary camera 142n identifying focus point 308, via auxiliary focus procedure 316, main focus procedure 310 may be terminated.

In another embodiment, in response to determining a focus value returned from a particular camera (e.g., camera 142n) at a most recent step is at least a predetermined amount less than a focus value returned at a second most recent step, CPU(s) 104 may determine that a focus value peak (e.g., focus value peak 326a) has been missed during a focus procedure (e.g., auxiliary focus procedure 316) of the particular camera (e.g., auxiliary camera 142n). In response to determining a focus value peak has been missed, CPU(s) 104 (1) automatically terminates an autofocus procedure utilized by another camera (e.g., main autofocus procedure 310) and (2) moves a position of a lens of the other camera (e.g., main camera 142a) to an assist position 328 corresponding to a previous position (e.g., a second most recent position or third most recent position) of the particular camera (e.g., auxiliary camera 142n). CPU(s) 104 then performs at least one reverse scan by both the particular camera (auxiliary camera 142n) and a second camera (main camera 142a) to identify a highest focus value. For example, in response to (1) identifying a focus value peak at a second most recent step 404n-1 of auxiliary lens 304n and (2) receiving a focus value at a most recent step 404n of auxiliary lens 304n, CPU(s) 104 may automatically terminate main autofocus procedure 310 and move a position of lens 304a of main camera 142a to a position corresponding to step 404n-1. Main lens 304a and auxiliary lens 304n may then perform, via respective focus procedures, at least one reverse scan, in which the direction of each lens is reversed and a step size of each lens is again adjusted (e.g., reduced to step size of 5). It should be noted that the adjusted step size may be greater than or less than the previous step size. In the above example, during a reverse scan, lens 304a, which is initially positioned at step 404n-1, is moved in the second direction (e.g., far focus to near focus) at the adjusted step size. Similarly, during a reverse scan, lens 304n, which is initially positioned at step 404n, is moved in the first direction (e.g., near focus to far focus) at the adjusted step size. At each additional step of a reverse scan, a focus value at a position of each of lenses 304a-n is identified. The focus values at each step are shared among camera 142a-n and may also be monitored by CPU(s) 104 and/or returned to CPU(s) 104 by cameras 142a-n. From the focus value data identified during the reverse scans, CPU(s) 104 determines focus value peaks 326a from among all identified focus values between the lens positions of steps 404n-1 and 404n. Focus value peak 326n is then identified as focus point 308 and lens 304a of main camera 142a is then synchronized to a lens position corresponding to focus point 308. In an alternate embodiment, CPU(s) 104 sets assist position 328 to a lens position that is a predetermined position distance from a most recent step of the camera that missed the focus peak (e.g., camera 142n). It should be noted that in one or more embodiments, when moving a position of a first lens (e.g., lens 304a) to a new position (e.g., position associated with step 404n-1) that was previously identified/established by a second lens (e.g., lens 304n), CPU(s) 104 may apply an adjustment to lens 304a to account for a known difference in physical spacing, orientation, and/or angle between lenses 304a-n.

In one embodiment, prior to initializing main focus procedure 310 and auxiliary focus procedure 316, CPU(s) 104 may instruct at least one of cameras 142a-n to perform a search boundary search/scan current scene 302 to identify a search boundary 320 in the range of camera 142a-n for current scene 302. The boundary search of the current scene can be performed in software by performing a contrast-based boundary search or may be performed in hardware of cameras 142a-n via fast auxiliary algorithm that utilizes at least one autofocus subsystem (e.g., autofocus subsystem 330a-n). The fast auxiliary algorithm may utilize, for example, ToF subsystems and/or PDAF subsystems to perform a boundary search. In one or more embodiments, CPU(s) 104 may determine whether cameras 142a-n include specific hardware autofocus subsystems for performing a fast auxiliary algorithm boundary search and may prioritize boundary searches using fast auxiliary algorithms over other supported software-based boundary search methods. For example, CPU(s) 104 may perform fast auxiliary algorithm boundary searches via ToF subsystems and/or PDAF subsystems, if supported by cameras 142a-n, and may default to a software contrast-based boundary search for those of cameras 142a-n that do not support ToF and/or PDAF boundary searches. In another embodiment, CPU(s) 104 may prioritize performing different types of fast auxiliary algorithm boundary searches by each of cameras 142a-n if multiple fast auxiliary algorithms are supported among cameras 142a-n. Search boundary 320 represents a focus area in which cameras 142a-n will perform focus procedures to identify focus point 308 within current scene 302. In one embodiment, a boundary search of current scene 302 may identify search boundary 320 as being the full range of cameras 142a-n (i.e., full sweep of cameras 142a-n between lens positions 0-999, as illustrated in FIG. 4). In another embodiment, the boundary search of current scene 302 may identify search boundary 320 that is smaller than the full range of cameras 142a-n (e.g., search boundary between lens positions 400-900). In one embodiment, each boundary search by cameras 142a-n may return estimated focus peaks 332a-n, which represent an estimated focus point in scene 302 that was identified during the search boundary scan of current scene 302. CPU(s) 104 may then establish search boundary 320 based on a lens position associated with estimated focus peaks 332a-n. For example, in response to performing a PDAF fast auxiliary algorithm by camera 142a and a ToF fast auxiliary algorithm camera 142n, cameras 142a-n identifies estimated focus peak 332a at lens position 650. CPU(s) 104 establishes search boundary 320 within a predetermined range (e.g., within 250 lens positions) of either side of the position of estimated focus peak 332a (e.g., between lens positions 400 and 900).

In response to determining search boundary 320, CPU(s) 104 divides the search boundary 320 by the number of cameras 142a-n to create search ranges 322a-n. Each search range 322a-n is a subdivision of search boundary 320 and is assigned to a particular one of cameras 142a-n. In the illustrated embodiment, CPU(s) 104 divides search boundary 320 in two to create first search range 322a and second search range 322n. Main camera 142a then performs main focus procedure 310 only in first search range 322a and auxiliary camera 142n performs auxiliary focus procedure 316 only in second search range 322n. CPU(s) 104 combines the results from main focus procedure 310 and auxiliary focus procedure 316 to determine a focus peak (e.g., focus peak 326a). CPU may then determine, as focus point 308, a focus peak (e.g., focus peak 326a) from among on the results returned by main camera 142a and auxiliary camera 142n during main focus procedure 310 and auxiliary focus procedure 316. In one or more embodiments, in response to determining focus point 308, lenses 304a-n are both synchronized to a lens position corresponding to focus point 308. At least one of cameras 142a-n may also independently perform a fine scanning focus procedure via a corresponding focus procedure 316, to confirm the focus point 308 as corresponding to a greatest focus value peak in current scene 302. In one or more embodiments, the fine scanning focus procedure may be performed by at least one of cameras 142a-n to compensate for a deviation in physical position/spacing, orientation, and/or angle between lenses 304a-n Referring now to FIG. 5, there is illustrated an example focus value curve having a divided search range utilized by a plurality of cameras, in accordance with one or more embodiments. As illustrated, search boundary 320 between a lens position of 400 and 900 has been divided into first search range 322a (corresponding to lens positions of 400-650) and second search range 322n (corresponding to lens positions between 650-900). During main focus procedure 310, lens 304a is moved in a first direction (e.g., from near focus to far focus), within first search range 322a, at steps 502a-n. Concurrently, during auxiliary focus procedure 316, lens 304n is moved in a second direction (e.g., from far focus to near focus), within second search range 322n, at steps 504a-n. At each step (e.g., steps 502a-n and steps 504a-n) a corresponding focus value is determined by cameras 142a-n and is shared among cameras 142a-n. The results (e.g., results 314a-n) of main focus procedure 310 in first range 322a and auxiliary focus procedure 316 in second range 314n are returned to CPU(s) 104. CPU(s) 104 combines the results (e.g., results 314a-n) of main focus procedure 310 and auxiliary focus procedure 316 and determines, from the combined results, a focus value peak (e.g., focus value peak 326a) at a lens position corresponding to step 504n. In the illustrated example, camera 142a does not identify a focus value peak. In response to determining focus value peak 326a, CPU(s) 104 moves the positions of lenses 304a-n to the lens position corresponding to step 504n. In one or more embodiments, after moving lenses 304a-n to the lens position corresponding to step 504n, CPU(s) 104 may further instruct cameras 142a-n to independently perform at least one fine scanning procedure.

Referring now again to FIG. 3, in another embodiment, the results of the boundary searches may identify multiple estimated focus peaks 332a-n. For example, a first fast auxiliary algorithm (using a PDAF autofocus subsystem) performed by camera 142a may identify a first focus value peak 332a at a lens position of 200 and a second fast auxiliary algorithm (using a ToF autofocus subsystem) performed by camera 142n may identify a second focus value peak 322n at a lens position of 800. In one embodiment, in response to identifying multiple estimated focus peaks 332a-n, CPU(s) 104 may establish a plurality of divided search ranges 322a-n in which each individual search range is associated with a particular estimated focus peak 332a-n determined during the fast auxiliary algorithms/boundary searches. Using the above example, CPU(s) 104 establishes a first search range 322a that begins at a first point (e.g., lens position of 100) corresponding to a predetermined distance (e.g., 100 lens positions) before first estimated focus peak 332a (lens position 200) and ends at a second point (e.g., lens position 300) a predetermined distance after first estimated focus peak 332a. CPU(s) 104 similarly establishes a second search range 322n that begins at a first point (e.g., lens position of 700) corresponding to a predetermined distance (e.g., 100 lens positions) before second estimated focus peak 332n (lens position 800) and ends at a second point (e.g., lens position 900) after second estimated focus peak 332n. CPU(s) 104 then associates the first search range 322a with main focus procedure 310 and the second search range 322n with auxiliary focus procedure 316. Thus, main focus procedure 310 is only performed within the first search range 322a and auxiliary focus procedure 316 is only performed within the second search range 322n. In response to main focus procedure 310 and auxiliary focus procedure 316 completing, CPU(s) 104 combines the autofocus data collected during the main and auxiliary focus procedures and selects, as focus point 308, a greatest of focus value peaks 326a-n identified during the main and auxiliary focus procedures. CPU(s) 104 then automatically moves/positions main camera lens 304a and/or at least one auxiliary camera lens 304n to a position corresponding to focus point 308. In another embodiment, CPU(s) monitors focus value data obtained during main focus procedure 310 and auxiliary focus procedure 316 and may terminate the main and auxiliary focus procedures prior to completion in response to determining a greatest focus value peak 326 has already been identified.

In another embodiment, in response to identifying multiple estimated focus peak 332a-n, CPU(s) 104 may calculate a single search boundary 320 as starting at a first point (e.g., lens position of 150) that is within a predetermined distance (e.g., 50 lens positions) before first focus value peak 326a and that ends at a second point (e.g., lens position of 850) within a predetermined distance after the second focus value peak 326n. CPU(s) 104 then performs main focus procedure 310 starting at the first point and moving main camera lens 304a in a first direction (e.g., near focus to far focus) and simultaneously performs auxiliary focus procedure 316 starting at the second point and moving auxiliary camera lens 304n in a second direction (e.g., far focus to near focus).

Referring now to FIG. 6, there is illustrated an example focus value curve associated with autofocus procedures performed by a plurality of cameras within a plurality of divided search ranges, in accordance with one or more embodiments. As illustrated, a first search range 322a (corresponding to lens positions of 100-300) associated with first estimated focus peak 332a and second search range 322n (corresponding to lens positions between 700-900) associated with second estimated focus peak 332n have been established. During main focus procedure 310, lens 304a is moved in a first direction (e.g., near focus to far focus), within first search range 322a, at steps 602a-n. Simultaneously, during auxiliary focus procedure 316, lens 304n is moved in a second direction (e.g., far focus to near focus), within second search range 322n, at steps 604a-n. In another embodiment, main focus procedure 310 and auxiliary autofocus procedure 316 may move lenses 304a-n in a same direction while searching in divided search ranges 322a-n. At each step (e.g., steps 602a-n and steps 604a-n) a corresponding focus value is determined by cameras 142a-n. The results (e.g., results 314a-n) of main focus procedure 310 in first range 322a and auxiliary camera 142n in second range 314n are combined by CPU(s) 104 and utilized to determine focus point 308 that corresponds to a greatest focus value peak from among focus value peaks 326a-n.

Figure 7A:
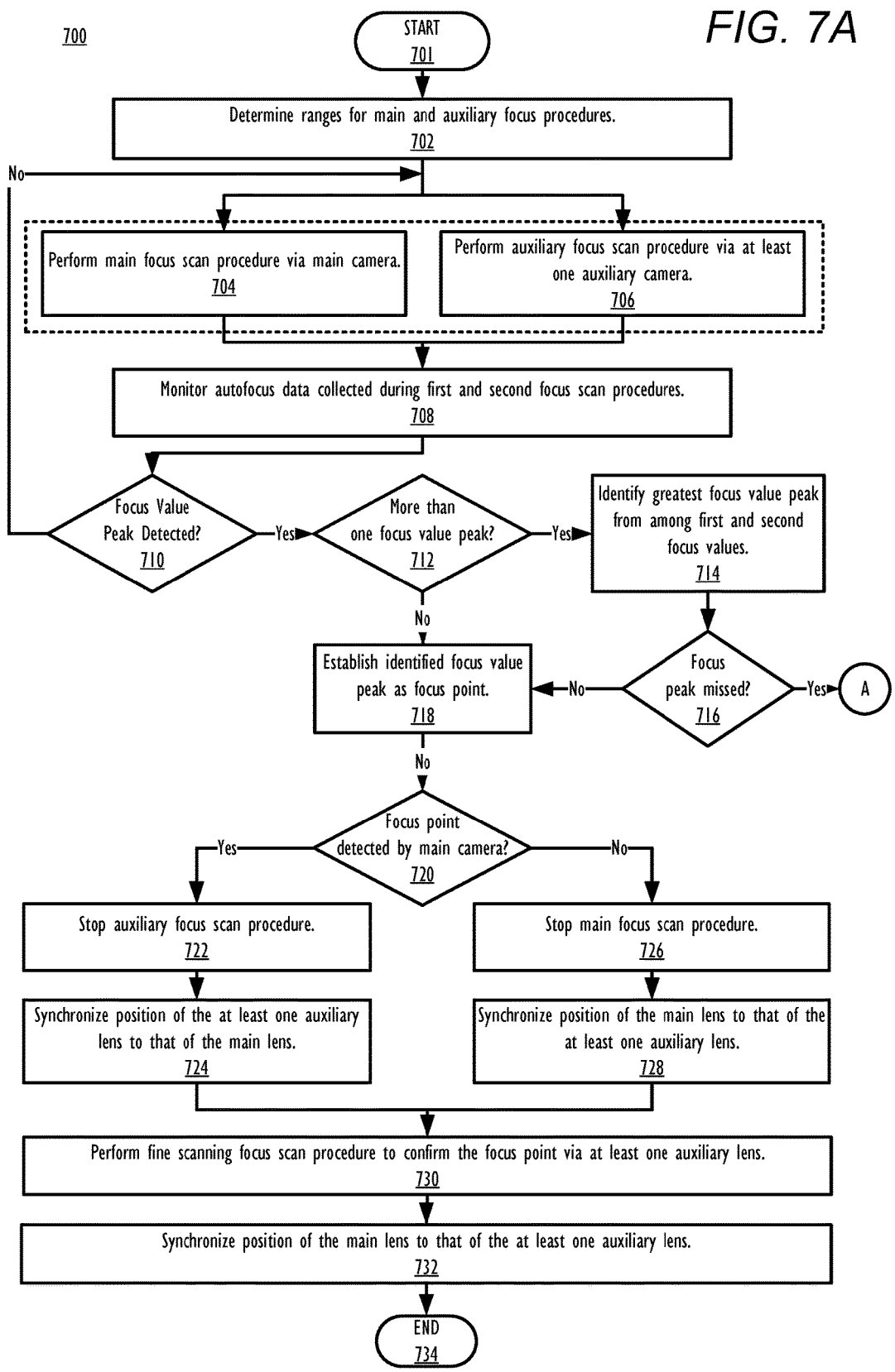
FIG. 7A is a flow chart illustrating a method for identifying a focus point of a current scene using a plurality of cameras, in accordance with one or more embodiments.
Figure 7B:
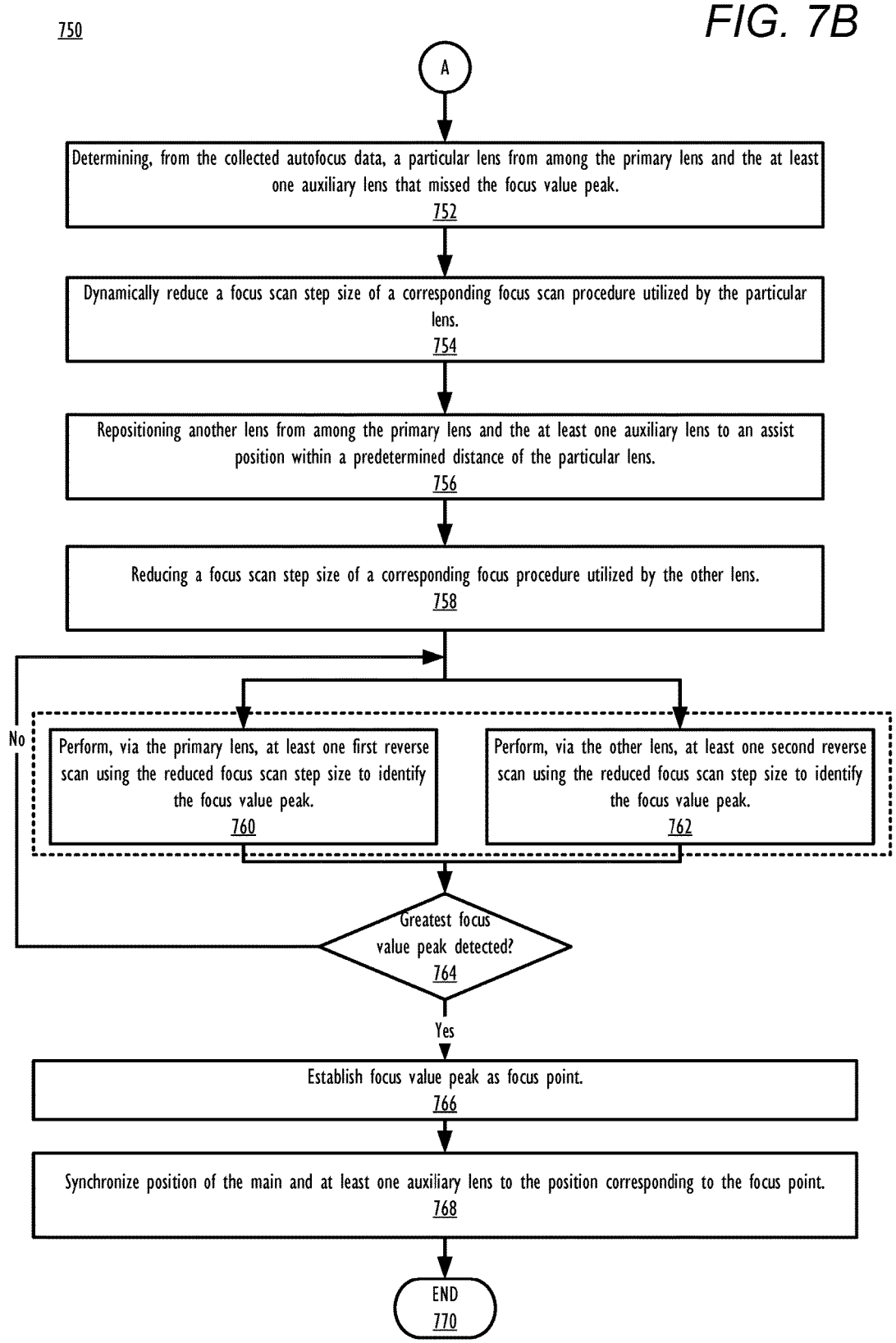
FIG. 7B is a flow chart illustrating a method for identifying a missed focus point, in accordance with one or more embodiments.

Referring now to FIGS. 7A-B, there is depicted a high-level flow-chart illustrating a method for obtaining a focus point of a current scene using at least two cameras, in accordance with one or more embodiments of the present disclosure. Aspects of the method are described with reference to the components of FIGS. 1 and 3. Several of the processes of the method provided in FIGS. 7A-B can be implemented by a processor (e.g., CPU(s) 104) executing software code of MCAFU 117 within an image capturing device (e.g., image capturing device 100). The method processes described in FIG. 7A-B are generally described as being performed by components of image capturing device 100.

Referring first to FIG. 7A, method 700 commences at initiator block 701 then proceeds to block 702. At block 702, CPU(s) 104 determines search ranges 322a-n associated with each of main focus procedure 310 and auxiliary focus procedure 316. In response to determining search ranges 322a-n associated with each of main focus procedure 310 and auxiliary focus procedure 316, CPU(s) 104 performs main focus procedure 310 via main camera 142a (block 704) and CPU(s) 104 contemporaneously performs auxiliary focus procedure 316 via auxiliary camera 142n (block 706). At block 708, CPU(s) 104 monitors autofocus data (and/or results 314a-n) collected during main focus procedure 310 and auxiliary focus procedure 316 by cameras 142a-n. At block 710, CPU(s) 104 determines whether at least one of cameras 142a-n have detected a focus value peak 326. In response to determining at block 710 that a focus value peak 326 has not been found, method 700 loops back to blocks 704-706. In response to determining at block 710 that a focus value peak 326 has been found, CPU(s) 104 determines whether more than one focus value peak (e.g., focus value peak 326a and focus value peak 326n) has been identified by cameras 142a-n (block 712). In response to determining only a single focus value peak (e.g., focus value peak 326a) has been identified, method 700 continues to block 718.

In response to determining more than one focus value peak has been identified by cameras 142a-n, CPU(s) 104 selects a greatest focus value peak from among various focus value peaks 326a-n identified by cameras 142a-n (block 714). In response to determining the greatest focus value peak from among focus value peaks 326a-n, CPU(s) 104 determines whether the greatest focus value peak is associated with a missed focus value peak in current scene 302 (e.g., when a most recent focus value returned from the camera that identified the greatest focus value peak is less than a focus value returned from that same camera at a second most recent step), as described in greater detail in FIG. 3, above. In response to determining the identified focus value peak has been missed, CPU(s) 104 performs an identification of focus point 308 based on the missed focus value peak, as provided in FIG. 7B. In response to determining the identified focus value peak has not been missed, method 700 continues to block 718.

At block 718, the identified focus value peak (e.g., focus value peak 326a) is established as focus point 308. CPU(s) 104 then determines whether focus point 308 was identified by main camera 142a (block 720). In response to determining focus point 308 was identified by main camera 142a, CPU(s) 104 stops auxiliary focus procedure 316 (block 722) and synchronizes a position of at least one auxiliary lens 304n of the at least one auxiliary camera 142n to that of main lens 304a of main camera 142a (block 724). Method 700 then continues to block 730. In response to determining focus point 308 was not identified by main camera 142a, CPU(s) 104 stops main focus procedure 310 (block 726) and synchronizes a position of the main lens 304a of main camera 142a to the at least one auxiliary lens 304n of the at least one auxiliary camera 142n that detected the focus value peak (block 728). Method 700 then continues to block 730.

At block 730, CPU(s) 104 performs a fine scanning focus procedure via at least one auxiliary lens 304n to confirm focus point 308. In response to completion of the fine scanning focus procedure, CPU(s) 104 synchronizes the position of main lens 304 to that of the at least one auxiliary lens 304n (block 732). Method 700 then terminates at end block 734.

FIG. 7B is a flow chart illustrating a method for identifying a focus point responsive to missing a focus peak during a focus procedure, as illustrated by step 716 of FIG. 7A. Method 750 commences at block 752 in which CPU(s) 104, determines, from the autofocus data (and/or results 314a-n) returned by cameras 142a-n, that a particular lens (e.g., lens 304n) from among primary lens 304 and at least one auxiliary lens 304n missed focus value peak 326a. At step 754, CPU(s) 104 reduces a focus scan step size (e.g., auxiliary focus scan step 318n) of a corresponding focus procedure (e.g., auxiliary focus procedure 316) that is utilized by the particular lens (e.g., lens 304n). At block 756, CPU(s) 104 repositions another lens (e.g., lens 304a) from among primary lens 304a and at least one auxiliary lens 304n to assist position 328. At block 758, CPU(s) 104 reduces a focus scan steps size (e.g., main focus scan step 312a) of a corresponding focus procedure (e.g., main focus procedure 310) that is utilized by the other lens (e.g., lens 304a). CPU(s) 104 then concurrently performs (1) at least one reverse scan, via main lens 304a, using the reduced focus scan steps size (e.g., main focus scan step 312a) of main focus procedure 310 (block 760) and (2) at least one reverse scan, via auxiliary lens 304n, using the reduced focus scan steps size (e.g., main focus scan step 318n) of auxiliary focus procedure 316 (block 762).

At block 764, CPU(s) 104 determines, from autofocus data returned from cameras 142a-n, whether at least one of cameras 142a-n have detected a greatest focus value peak 326. In response to determining at block 764 that a greatest focus value peak 326 has not been found, method 750 loops back to blocks 760-762. In response to determining at block 764 that a greatest focus value peak (e.g., focus value peak 326a) has been found, the greatest focus value peak is established as focus point 308 (block 766). In another embodiment, in response to the movement of lenses 304a-n reaching a same position during the reverse scans, the reverse scans are terminated and a greatest focus value identified during the reverse scans is established as focus point 308. CPU(s) 104 then synchronizes a position of main lens 304a and the at least one auxiliary lens 304n to a position associated with focus point 308 (block 768). Method 750 then terminates at end block 770.

Figure 8:
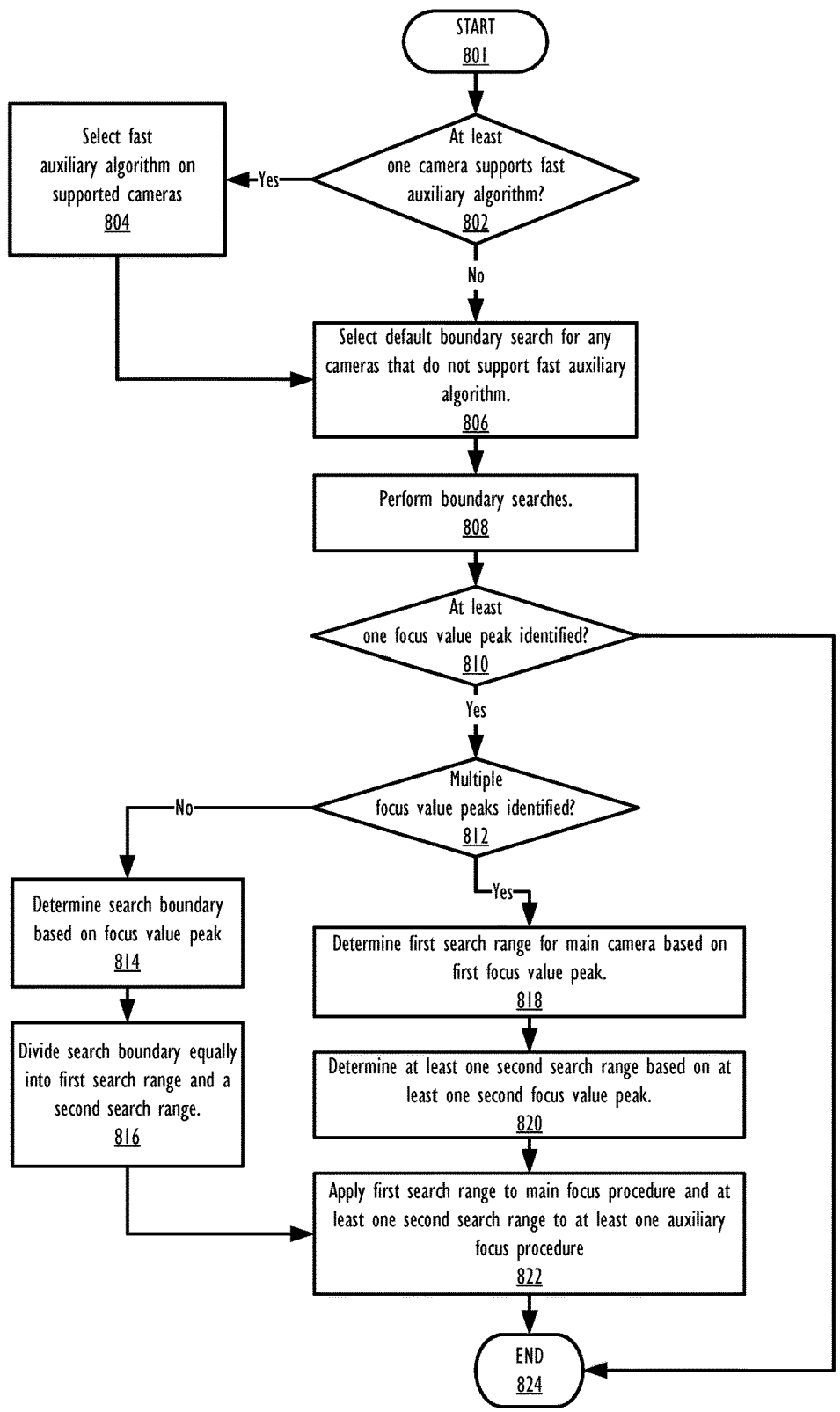
FIG. 8 is a flow chart illustrating a method for determining a search range for each of a plurality of cameras of an image capturing device, in accordance with one or more embodiments.

Referring now to FIG. 8, there is depicted a high-level flow-chart illustrating a method for determining a search range of multiple cameras, in accordance with one or more embodiments of the present disclosure. In one or more embodiments, the features and functionality provided by method 800 may be performed by CPU(s) 104 at block 702 of method 700, as depicted in FIG. 7. Method 800 commences at initiator block 801, then proceeds to block 802. At block 802, CPU(s) 104 individually determines, for each of cameras 142a-n, whether at least one fast auxiliary algorithm is supported. In response to determining none of cameras 142a-n support a fast auxiliary algorithm, method 800 proceeds to block 806. In response to identifying at least one of cameras 142a-n supports at least one fast auxiliary algorithm, CPU(s) 104 selects, a supported fast auxiliary algorithm for each of the identified cameras (block 804).

At block 806, CPU(s) 104 selects a default boundary search method/algorithm (e.g., contrast-based boundary search) for only those of cameras 142a-n that do not support a fast auxiliary algorithm. It should be noted that this may include all cameras (if no cameras support fast auxiliary algorithms), no cameras (if all cameras support fast auxiliary algorithm) or only select cameras (if only a subset of cameras support fast auxiliary algorithms). At block 808, CPU(s) 104 performs a boundary search by each of cameras 142a-n using a corresponding selected boundary search method/fast auxiliary algorithm. In response to the boundary searches completing, CPU(s) 104 receives results from cameras 142a-n. CPU(s) 104 then determines from the returned results whether at least one estimated focus peak 332a-n was identified by cameras 142a-n (block 810). In response to determining an estimated focus peak 332a-n was not identified by cameras 142a-n during the boundary searches, CPU(s) 104 establishes the search range within main focus procedure 310 and auxiliary focus procedure 316 to a full search range (e.g., 0-999) of cameras 142a-n (block 820). Method 800 then terminates at block 824.

In response to determining at least one focus value peak was identified by cameras 142a-n during the boundary searches, CPU(s) 104 determines whether multiple focus value peaks 326a-n were identified by cameras 142a-n during the boundary searches (step 812). In response to determining only a single focus value peak (e.g., focus value peak 326a) was identified by cameras 142a-n during the boundary searches, CPU(s) 104 establishes search boundary 320 based on the identified focus value peak (block 814). In one embodiment, search boundary 320 is established between a predetermined distance (e.g., within 50 lens positions) on a close focus side and a far focus side of a lens position corresponding to identified focus value peak. At block 816, CPU(s) 104 divides search boundary 320 equally into first search range 322a and second search range 322n. At block 822, CPU(s) 104 applies (1) first search range 322a to main focus procedure 310 and (2) second search range 322n to auxiliary focus procedure 316. Method 800 then terminates at block 824.

In response to determining only multiple focus value peaks (e.g., focus value peak 326a and focus value peak 326n) were identified by cameras 142a-n during the boundary searches, CPU(s) 104 determines first search range 322a based on first focus value peak 326a (block 818), and CPU(s) 104 determines second search range 322n based on second focus value peak 326n (block 820). Method 800 then continues to block 822, in which CPU(s) 104 applies (1) first search range 322a to main focus procedure 310 and (2) second search range 322n to auxiliary focus procedure 316. Method 800 then terminates at block 824.

In the above-described flow charts, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
   performing, via a main lens of a main camera, a first focus procedure that scans a current scene by focusing the main lens in a first direction; and
   concurrently performing, via at least one auxiliary lens of at least one auxiliary camera, a second focus procedure that scans the current scene by focusing the at least one auxiliary lens in a second direction that is opposite the first direction;
   identifying a focus value peak within autofocus data collected during the first and second focus procedures;
   establishing the focus value peak as a focus point;
   determining whether the focus point was identified by the at least one auxiliary camera; and
   in response to determining the focus point was identified by the at least one auxiliary camera:
      terminating the first focus procedure;
      performing, via the at least one auxiliary lens, a fine scanning focus procedure to confirm the focus value peak as a greatest focus value peak for the current scene; and
      automatically synchronizing a position of the main lens to that of the at least one auxiliary lens responsive to successful completion of the fine scanning focus procedure.

2. The method of claim 1, further comprising:
   in response to determining the focus point was identified by the main camera:
      terminating the second autofocus procedure; and
      automatically synchronizing a position of the at least one auxiliary lens to that of the main lens.

3. The method of claim 1, further comprising:
   calculating an autofocus search range for the current scene;
   dividing the autofocus search range in two to create a first range and a second range;
   assigning the first divided range to the main camera, wherein the main camera performs the first focus procedure within only the first divided range;
   assigning the second divided range to the at least one auxiliary camera, wherein the at least one auxiliary camera performs the second focus procedure within only the second divided range;
   in response to the first focus procedure and the second focus procedure completing, combining the autofocus data collected during the first and second focus procedures;
   identifying the focus value peak within the combined autofocus data; and
   automatically positioning the main lens and the at least one auxiliary lens to a position corresponding to the focus point.

4. The method of claim 1, wherein identifying the focus value peak further comprises:
identifying, within the collected autofocus data, a first focus value peak associated with a time-of-flight (TOF) data and a second focus value peak associated with a phase detection autofocus (PDAF) data, wherein the first focus value peak and the second focus value peak are different;
calculating a first autofocus search range for the first focus value peak;
calculating a second autofocus search range for the second focus value peak;
performing a first contrast-based autofocus search within the first autofocus search range via the main camera to identify a first focus value;
concurrently performing a second contrast-based autofocus search within the second autofocus search range via the at least one auxiliary camera to identify a second focus value;
determining a greatest focus value from among the first focus value and the second focus value;
identifying a particular focus value peak associated with the greatest focus value as the focus point; and
automatically positioning the main camera lens and the at least one auxiliary camera lens to a position corresponding to the focus point.

5. The method of claim 1, further comprising:
in response to determining, from the collected autofocus data, that a particular lens from among the main lens and the at least one auxiliary lens missed the focus value peak, dynamically adjusting a focus scan step size of a corresponding autofocus procedure utilized by the particular lens;
performing, via the particular lens, at least one first reverse scan using the adjusted focus scan step size to identify the focus value peak; and
automatically positioning the main camera lens and the at least one auxiliary camera lens to a position corresponding to the focus point.

6. The method of claim 1, further comprising:
in response to determining, from the collected autofocus data, that the particular lens missed the focus value peak:
repositioning another lens from among the main lens and the at least one auxiliary lens to an assist position that is within a predetermined distance of the particular lens; and
dynamically adjusting a focus scan step size of a corresponding second autofocus procedure utilized by the other lens; and
performing, via the other lens, at least one second reverse scan using the adjusted focus scan step size to identify the focus value peak;
wherein the at least one second reverse scan and the at least one first reverse scan are performed concurrently.

7. An image capturing device comprising:
a main camera that performs, via a main lens, a first focus procedure that scans a current scene by focusing the main lens in a first direction;
at least one auxiliary camera that concurrently performs with the first focus procedure, via at least one auxiliary lens, a second focus procedure that scans the current scene by focusing the at least one auxiliary lens in a second direction that is opposite the first direction;
a processor that is communicatively coupled to the main camera and the at least one auxiliary camera and which:
identifies a focus value peak within autofocus data collected during the first and second focus procedures;
establishes the focus value peak as a focus point;
determines whether the focus point was identified by the at least one auxiliary camera; and
in response to determining the focus point was identified by the at least one auxiliary camera:
terminates the first focus procedure;
performs, via the at least one auxiliary lens, a fine scanning focus procedure to confirm the focus value peak as a greatest focus value peak for the current scene; and
automatically synchronizes a position of the main lens to that of the at least one auxiliary lens responsive to successful completion of the fine scanning focus procedure.

8. The image capturing device of claim 7, wherein the processor, in response to determining the focus point was identified by the main camera:
terminates the second autofocus procedure; and
automatically synchronizes a position of the at least one auxiliary lens to that of the main lens.

9. The image capturing device of claim 7, wherein the processor:
calculates an autofocus search range for the current scene;
divides the autofocus search range in two to create a first range and a second range;
assigns the first divided range to the main camera, wherein the main camera performs the first focus procedure within only the first divided range;
assigns the second divided range to the at least one auxiliary camera, wherein the at least one auxiliary camera performs the second focus procedure within only the second divided range;
in response to the first focus procedure and the second focus procedure completing, combines the autofocus data collected during the first and second focus procedures;
identifies the focus value peak within the combined autofocus data; and
automatically positions the main camera lens and the at least one auxiliary camera lens to a position corresponding to the focus point.

10. The image capturing device of claim 7, wherein in identifying the focus value peak:
the processor:
identifies, within the collected autofocus data, a first focus value peak associated with a time-of-flight (TOF) data and a second focus value peak associated with a phase detection autofocus (PDAF) data, wherein the first focus value peak and the second focus value peak are different;
calculates a first autofocus search range for the first focus value peak; and
calculates a second autofocus search range for the second focus value peak;
the main camera performs a first contrast-based autofocus search within the first autofocus search range via the main camera to identify a first focus value;
the at least one auxiliary camera concurrently performs a second contrast-based autofocus search within the second autofocus search range via the at least one auxiliary camera to identify a second focus value; and
the processor:
determines a greatest focus value from among the first focus value and the second focus value;

identifies a particular focus value peak associated with the greatest focus value as the focus point; and automatically positions the main lens and the at least one auxiliary lens to a position corresponding to the focus point.

11. The image capturing device of claim 7, wherein:

the processor, in response to determining, from the collected autofocus data, that a particular lens from among the main lens and the at least one auxiliary lens missed the focus value peak, dynamically adjusts a focus scan step size of a corresponding autofocus procedure utilized by the particular lens;

the particular lens performs at least one first reverse scan using the adjusted focus scan step size to identify the focus value peak; and the processor automatically positions the main lens and the at least one auxiliary lens to a position corresponding to the focus point.

12. The image capturing device of claim 7, wherein:

the processor, in response to determining, from the collected autofocus data, that a particular lens missed the focus value peak:

repositions another lens from among the main lens and the at least one auxiliary lens to an assist position that is within a predetermined distance of the particular lens; and dynamically adjusts a focus scan step size of a corresponding second autofocus procedure utilized by the other lens; and the other lens performs at least one second reverse scan using the adjusted focus scan step size to identify the focus value peak;

wherein the at least one second reverse scan and the at least one first reverse scan are performed concurrently.

13. A computer program product comprising:

a non-transitory computer readable storage device; and program code stored on the computer readable storage device that when executed by a processor of a device that includes a main camera and at least one auxiliary camera, the program code enables the device to provide the functionality of:

performing, via a main lens of the main camera, a first focus procedure that scans a current scene by focusing the main lens in a first direction; and concurrently performing, via at least one auxiliary lens of the at least one auxiliary camera, a second focus procedure that scans the current scene by focusing the at least one auxiliary lens in a second direction that is opposite the first direction;

identifying a focus value peak within autofocus data collected during the first and second focus procedures;

establishing the focus value peak as a focus point;

determining whether the focus point was identified by the at least one auxiliary camera; and in response to determining the focus point was identified by the at least one auxiliary camera:

terminating the first focus procedure;

performing, via the at least one auxiliary lens, a fine scanning focus procedure to confirm the focus value peak as a greatest focus value peak for the current scene; and automatically synchronizing a position of the main lens to that of the at least one auxiliary lens responsive to successful completion of the fine scanning focus procedure.

14. The computer program product of claim 13, the program code further comprising code for:

identifying, within the collected autofocus data, a first focus value peak associated with a time-of-flight (TOF) data and a second focus value peak associated with a phase detection autofocus (PDAF) data, wherein the first focus value peak and the second focus value peak are different;

calculating a first autofocus search range for the first focus value peak;

calculating a second autofocus search range for the second focus value peak;

performing a first contrast-based autofocus search within the first autofocus search range via the main camera to identify a first focus value;

concurrently performing a second contrast-based autofocus search within the second autofocus search range via the at least one auxiliary camera to identify a second focus value;

determining a greatest focus value from among the first focus value and the second focus value;

identifying a particular focus value peak associated with the greatest focus value as the focus point; and automatically positioning the main lens and the at least one auxiliary lens to a position corresponding to the focus point.

15. The computer program product of claim 13, the program code further comprising code for:

calculating an autofocus search range for the current scene;

dividing the autofocus search range in two to create a first range and a second range;

assigning the first divided range to the main camera, wherein the main camera performs the first focus procedure within only the first divided range;

assigning the second divided range to the at least one auxiliary camera, wherein the at least one auxiliary camera performs the second focus procedure within only the second divided range;

in response to the first focus procedure and the second focus procedure completing, combining the autofocus data collected during the first and second focus procedures;

identifying the focus value peak within the combined autofocus data; and automatically positioning the main lens and the at least one auxiliary lens to a position corresponding to the focus point.

16. The computer program product of claim 13, the program code further comprising code for:

in response to determining, from the collected autofocus data, that a particular lens from among the main lens and the at least one auxiliary lens missed the focus value peak, dynamically adjusts a focus scan step size of a corresponding autofocus procedure utilized by the particular lens;

performing, via the particular lens, at least one first reverse scan using the adjusted focus scan step size to identify the focus value peak; and automatically positioning the main camera lens and the at least one auxiliary camera lens to a position corresponding to the focus point.

17. The method of claim 1, further comprising:

in response to determining a focus value returned at a most recent step of the first or second focus procedure is less than the focus value returned at a second most recent step:

determining the focus value peak as the focus value returned at the second most recent step; and identifying a position of a lens of the particular camera as the focus point.

18. The method of claim 1, wherein automatically synchronizing a position of the main lens comprises applying an adjustment to the main lens to account for a known difference in physical spacing, orientation, and/or angle between the main and the auxiliary lenses.

\* \* \* \* \*